United States Patent

Sanz

[19]

[11] Patent Number: 5,816,307
[45] Date of Patent: Oct. 6, 1998

[54] AIRCRAFT WINDOW ASSEMBLY HAVING A CIRCULAR, ROTATABLE LENS

[75] Inventor: Eduardo Sanz, San Antonio, Tex.

[73] Assignee: MSA Aircraft Interior Products, Inc., San Antonio, Tex.

[21] Appl. No.: 802,860

[22] Filed: Feb. 19, 1997

Related U.S. Application Data

[60] Provisional application No. 60/011,923 Feb. 20, 1996.

[51] Int. Cl.$^6$ ..................................................... B64C 1/14
[52] U.S. Cl. ................................ 160/84.04; 244/129.3; 160/90
[58] Field of Search ............................. 244/119, 129.3; 160/84.01, 84.06, 90, 84.04

[56] References Cited

U.S. PATENT DOCUMENTS

| | | | |
|---|---|---|---|
| 2,602,970 | 7/1952 | Gouge | 244/129.3 X |
| 3,191,240 | 6/1965 | Slaman et al. | 244/129.3 X |
| 3,691,686 | 9/1972 | Donegan | 244/129.3 X |
| 3,906,669 | 9/1975 | Vorguitch | 244/129.3 X |
| 4,679,610 | 7/1987 | Spraggins | 160/84.06 X |
| 4,998,576 | 3/1991 | Moreno | 160/90 |
| 5,082,043 | 1/1992 | Moreno | 160/90 |
| 5,467,943 | 11/1995 | Umeda | 244/129.3 |

*Primary Examiner*—William Grant
*Attorney, Agent, or Firm*—Miller, Sisson, Chapman & Nash, P.C.

[57] ABSTRACT

An aircraft window assembly for installing into the interior of an aircraft. The aircraft window assembly includes a reveal with a circular window opening defined by an inner perimeter. There is a collapsible shade with an upper end and lower end for attachment to the reveal. Side rails on the reveal engage the side of the shade. A circular inner lens has an inner and outer surface dimensioned to fit over the inner perimeter of the reveal and contains a handle on the inner surface of the inner lens for rotating the inner lens in a circular motion. A shade rail is mounted to the lower end of the shade and structure is provided to engage the shade rail to the outer surface of the inner lens so that when the handle of the inner lens is moved in a rotating manner, the shade moves between an open and closed position.

8 Claims, 2 Drawing Sheets

AIRCRAFT WINDOW ASSEMBLY HAVING A CIRCULAR, ROTATABLE LENS

This application claims the benefit under U.S.C. of provisional Appl. No. 60/011,923; filed on Feb. 20, 1996.

FIELD OF THE INVENTION

An aircraft window, more specifically, an aircraft window having a rotatable, transparent inner lens engaging a window shade to raise and lower the shade between an open and closed position.

BACKGROUND OF THE INVENTION

The cabin of an aircraft is usually provided with windows to allow light in and for passengers to view outward. Typically these windows are provided with an outer and an inner lens and with shades that may be raised or lowered. Sometimes there are shades mounted so as to be directly accessible to the passenger, in which the passenger can raise or lower the shade by directly handling the shade. However, shades are sometimes mounted between the interior and exterior lens of the aircraft window and, therefore, cannot be raised directly by contact with the passenger, but must be done through mechanical actuators, such as a handle and related mechanisms or through an electrical motor.

An example of mechanical actuators utilized to raise and lower aircraft window shades are found in the following U.S. Pat. Nos. 4,679,610; 4,998,576; and 5,082,043. These patents disclose various mechanical actuators to raise and lower aircraft window shades. However, due to dimensions and design, some of the prior art windows are not capable of replacing standard OEM aircraft windows without modification of the side walls or other parts of the interior adjacent to the aircraft window. For example, in the Beechcraft King Air 200, prior art windows would often require modification of the interior panels of that aircraft to accept the handle for raising and lowering the shade. Usually, this aircraft is provided from the factory with a rotating inner lens having a polarizing filter incorporated therein which is moved with respect to a fixed outer lens which also has a polarizing filter. The effect of rotating one lens with respect to the other is to control the amount of light coming through the lenses as the polarizing filters alternately either align for passage of polarizing light through the window or cross for impeding the transmission of light.

Applicant has provided for an OEM or replacement window for the Beechcraft King Air or as a window for any other suitable aircraft a window that, like the King Air, utilizes a rotating lens. Applicant provides for engaging the rotating lens to a shade for raising and lowering the shade between an open and closed position to control the amount of light entering the aircraft.

Applicant has provided, for the King Air or any other aircraft, a simple shade system for raising and lowering a shade located adjacent a rotating lens, the connection between the rotating lens and the shade for raising and lowering the shade. Such a window has the benefits of simplicity and, often, ease of installation.

OBJECTS OF THE INVENTION

It is, therefore, an object of this invention to provide for a simple, efficient, aircraft window having a rotating lens to operate a shade located adjacent the rotating lens is easily installed into an aircraft cabin.

SUMMARY OF THE INVENTION

This and other objects provided for in an aircraft window having a fixed lens and a rotating inner lens accessible to a passenger with a shade between the two lenses and with means for engaging the rotating lens with the shade so that, when the rotating lens is rotated by the passenger, the shade will raise and lower between an open and closed position to control the amount of light therethrough.

DETAILED DESCRIPTION OF THE PREFERRED EMBODIMENT

Figure 1:
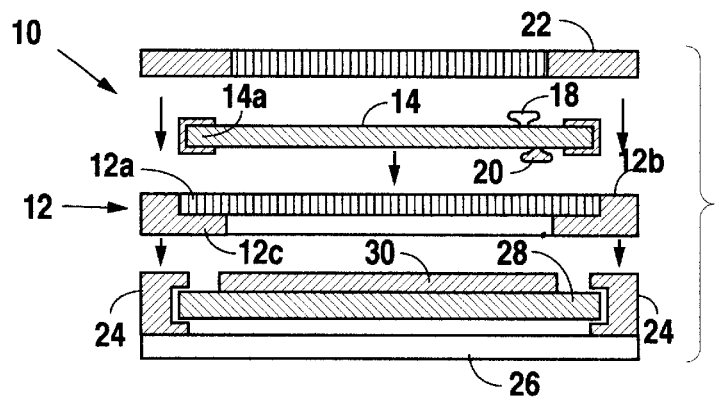
FIG. 1 is a cross-sectional top view in elevation through section A–A' of FIG. 3 the aircraft window system of applicant's present invention.

FIG. 1 illustrates the main components of applicant's unique window system (10). More specifically, FIG. 1 illustrates applicant's window system (10) including a frame or reveal (12) having a notch (12a) defined by a shoulder (12b) and a base (12c), all of which define the round opening (12d). As is seen in cross section, shoulder (12b) and base (12c) define notch (12a) with an inner perimeter of base (12c) being circular (see FIG. 3). The frame or reveal is typically made out of fiberglass and is flat.

Applicant provides an inner lens (14), typically transparent and made of nonopaque or transparent lexen, dimensioned to fit within notch (12a) as set forth in FIG. 1. The inner lens has as the outer perimeter thereof circumference (14a). The circumference portion is typically provided with a seal (16) to provide for a sealing fit with respect to the reveal and a cover (22) which will "sandwich" the inner lens in place so that it can rotate. Rotation of the inner lens is provided by a handle (18) mounted to the outer surface of the inner lens. The seal material is typically the pile portion of VELCRO® material or a felt-like material, but may be any material which will allow a generally dust-proof sealing between cover (22) and reveal (12) while allowing the inner lens to slide cleanly and freely along base (12c) and the inner surface of cover (22). As seen in FIG. 1, cover (22) has a cut-out central portion that has generally the same dimensions as opening (12d) of reveal (12) but may be smaller to help completely open the window, that is, so it will appear that the shade is raised completely (see FIG. 3).

The handle is, of course, mounted to the outer surface of inner (rotating) lens (14) to provide access to the passenger. On the surface away from the passenger cabin, on the outer surface of inner lens (14), slider (20) is mounted (see also FIG. 6), the details and function of which follow.

Figure 6:
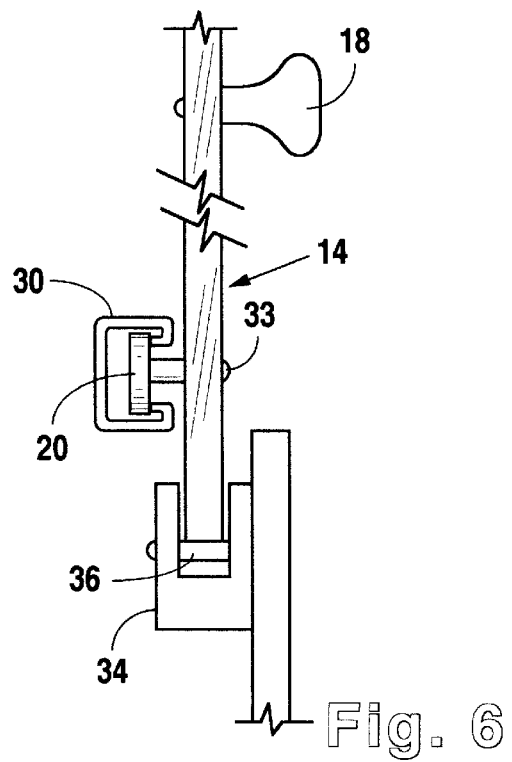
FIG. 6 is a detailed view in side elevation of the engagement means of applicant's present invention as well as the alternate preferred centering means for centering the inner lens, as illustrated in FIG. 5.

Turning now back to FIG. 1, it is seen that applicant's aircraft window system (10) includes frame rails (24) and outer lens (26). A shade (28), typically a collapsible pleated shade such as that manufactured by Hunter-Douglas Mfg. and sold as ECLIPSE™ (which is split in half and stacked back-to-back so they "nest" for lesser thickness), is provided for the mounting to the frame rails (24). The shade has a movable lower shade rail (29) and a fixed upper shade rail (31). The upper shade rail (31) is designed to remain fixed with respect to the reveal. Attached to lower shade rail (29) is slider rail (30) (see also FIG. 6). As can be seen in FIG. 6, the slider rail is generally C-shaped and contains within the arms of the "C" a track for movement of slider (20) therein. Slider (20) may be, for example, a nylon disk so it slides easily with respect to the arms of slider rail (30).

With the structure set forth above, it can be seen how rotation of inner lens (14) will cause lower shade rail (29) to raise and fall. Specifically, with reference to FIGS. 2, 5, and 6, it is seen that rotation of handle (18) in the direction of the arrows given in FIGS. 5 and 6 will cause the shade rail to raise and fall given that such rotation causes slider (20) to engage either the upper or the lower arm of slider rail (30) in such a fashion as to transmit the torque of rotation of the window to a translational force along lower shade rail (29).

Figure 3:
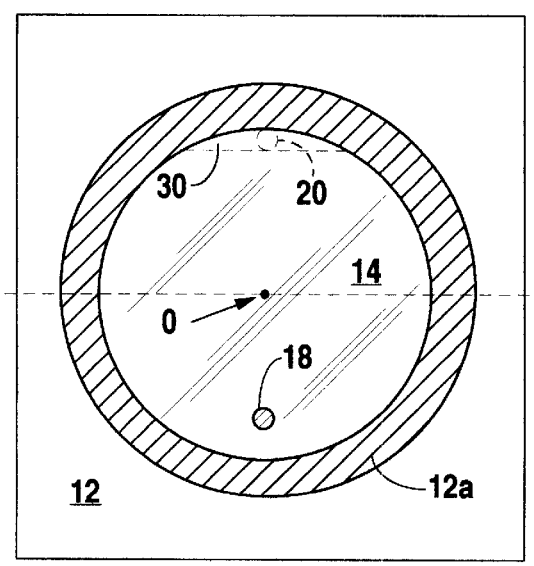
FIG. 3 is a front elevational view of the frame or reveal of applicant's present invention with the inner lens nested therein.

FIG. 3 illustrates origin "0" as the point about which inner lens (14) rotates. It is seen that the handle is usually closer to "0" than slider (20). Moveover, the handle and slider do not necessarily lie on the same axis. For example, as illustrated in FIG. 3, when the handle is at the bottom of its arc, the shade is up—there being 180° between the handle and the slider.

Figure 2:
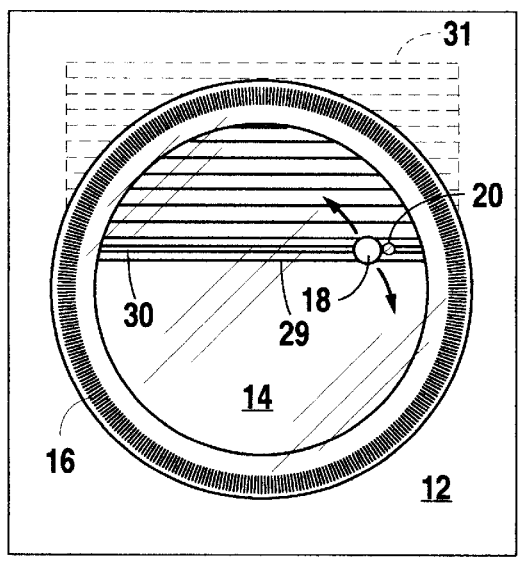
FIG. 2 is a front elevational view of the window system of applicant's present invention.
Figure 4:
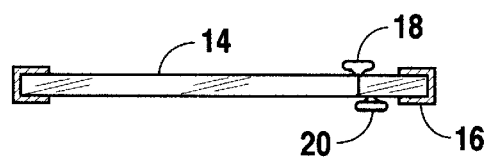
FIGS. 4 and 4a are side elevational views in cross section of the inner lens of applicant's present invention.
Figure 4A:
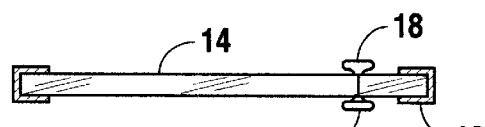

FIG. 4 shows a view of the inner lens with the slider further out toward the edge of the lens than the handle (see also FIGS. 1 and 2). FIG. 4a illustrates that the handle and the slider may be opposite one another.

Figure 5:
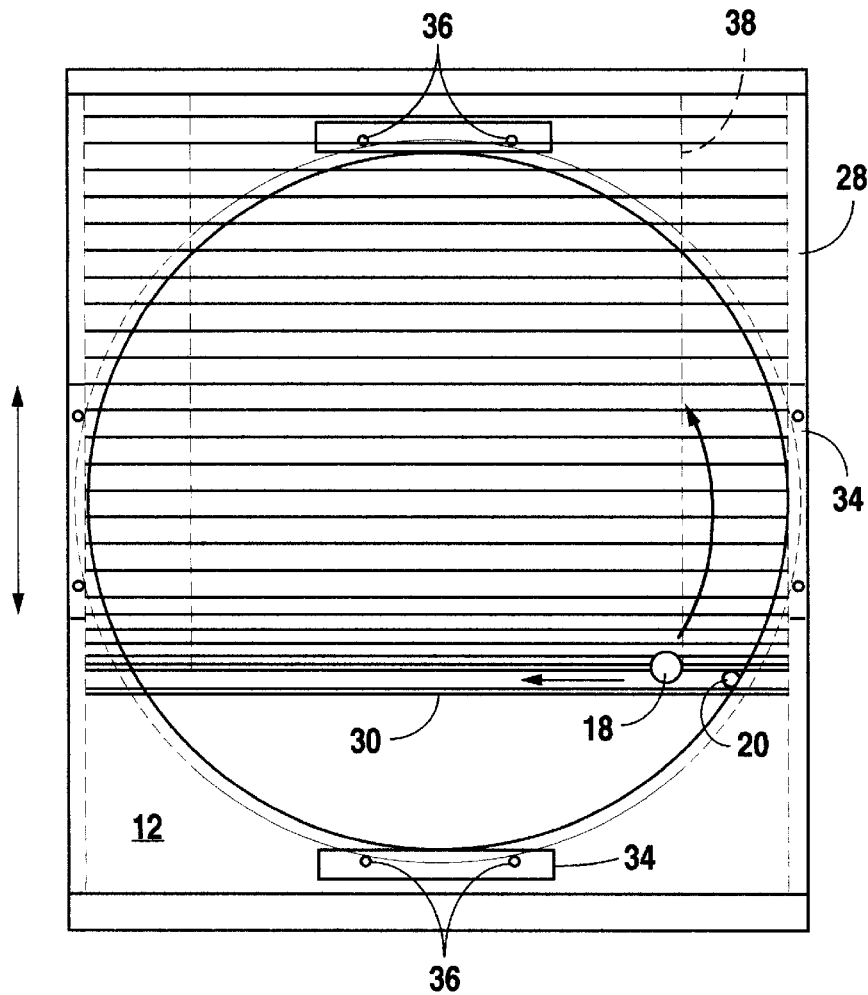
FIG. 5 is a front elevational view of applicant's window system utilizing an alternate preferred embodiment for centering the inner lens of applicant's present invention.

FIG. 5 illustrates an alternate preferred embodiment of applicant's present invention wherein, instead of a notch reveal (12), and the lens (14) rides in four centering means located equilaterally around a 360° projection. Centering means (34) may be simply a section of a U-shaped bracket on which a bearing pin (36) is mounted. Each channel would typically have two bearing pins for sealing engagement with the inner lens at seal (16). The pins may contain a nylon sleeve to enhance ease of rotation of the inner lens.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims. For example, although reference is made to use of the system with an aircraft window, it may be utilized as a window for any vehicle or structure where its unique features would be appropriate.

What is claimed is:

1. An aircraft window assembly comprising:
    a reveal with a circular window opening defined by an inner perimeter thereof;
    a collapsible shade having an upper end and a lower end, the upper end for attachment to said reveal;
    side rails attached to said reveal for engaging said shade;
    a circular inner lens having an inner and outer surface dimensioned to fit over the inner perimeter of the reveal with a handle on the inner surface of the inner lens, the handle for rotating the inner lens;
    a shade rail mounted to the lower end of the shade; and
    means for engaging said shade rail to the outer surface of said inner lens to move said shade between an open and a closed position when said inner lens is rotated.

2. The device of claim 1, wherein said means for engaging includes a slider mounted to the inner surface of the inner lens and wherein said shade rail includes channels for engaging the slider.

3. The device of claim 2 further including sealing means for sealingly and slideably engaging the reveal with the inner lens.

4. The device of claim 1 further including sealing means for sealingly and slideably engaging the reveal with the inner lens.

5. The device of claim 4, wherein said sealing means includes the loop portion of a hook and loop fastener being attached to the inner lens on the perimeter portion thereof.

6. The device of claim 1 further comprising a cover for maintaining the inner lens adjacent the perimeter portion of the reveal, the cover mounting against an outer surface of the reveal and having a circular opening sized the same as the circular window opening of said reveal.

7. The device of claim 1, wherein the inner perimeter of said reveal includes a notch having a base portion and a shoulder and wherein said inner lens is dimensioned to fit into the notch and lay generally flush against the base and the notch.

8. The device of claim 7, further comprising a cover for maintaining the inner lens adjacent the perimeter portion of the reveal, the cover mounting against an outer surface of the reveal and having a circular opening sized the same as the circular window opening of said reveal.

* * * * *